United States Patent [19]

Klann

[11] Patent Number: 4,457,296
[45] Date of Patent: Jul. 3, 1984

[54] HEATING MODEL

[76] Inventor: Paul A. Klann, P.O. Box 2398, Waynesboro, Va. 22980

[21] Appl. No.: 256,263

[22] Filed: Apr. 21, 1981

[51] Int. Cl.³ .............................................. F24J 3/02
[52] U.S. Cl. .................................. 126/417; 33/1 DD; 33/269
[58] Field of Search ...................... 126/417, 424, 451; 33/1 DD, 62 A, 281, 269

[56] References Cited

U.S. PATENT DOCUMENTS

| | | | |
|---|---|---|---|
| 2,328,456 | 8/1943 | Humphreys | 33/1 DD |
| 2,478,315 | 8/1949 | Pollman | 33/1 DD |
| 2,884,697 | 5/1959 | Sylvester | 33/1 DD |
| 3,068,574 | 12/1962 | Bieg | 33/1 DD |
| 3,568,320 | 3/1971 | Potter | 33/1 DD |
| 4,159,576 | 7/1979 | Campbell | 33/281 |

FOREIGN PATENT DOCUMENTS 21316  1/1909  Fed. Rep. of Germany .... 33/1 DD

Primary Examiner—Larry Jones
Attorney, Agent, or Firm—Sughrue, Mion, Zinn, Macpeak and Seas

[57] ABSTRACT

A passive solar heating model for studying the daylight illumination of a lot containing buildings and trees comprises a platform, a pair of arms pivotally mounted at one end thereof to the opposite sides of the platform, and an arcuate guide track pivotally mounted to the free ends of the arms for supporting a light source. The pivotal arms allow adjustments to account for the latitude corresponding to the parallel on which the lot is located and the pivotal guide track allows adjustments to accommodate for the time of the year to be studied. Finally, the light source is movably mounted on the track allowing for time-of-the-day adjustments.

5 Claims, 8 Drawing Figures

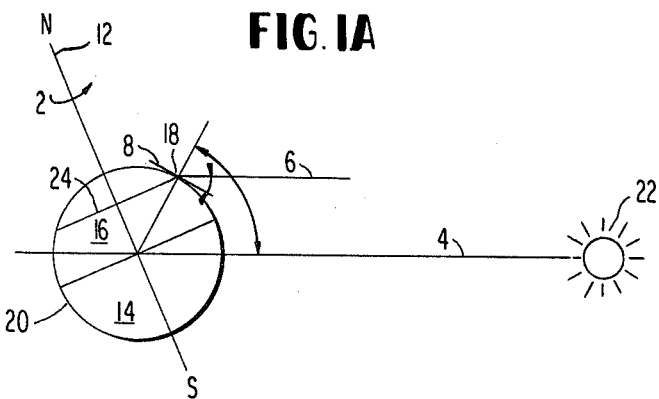
FIG.1A
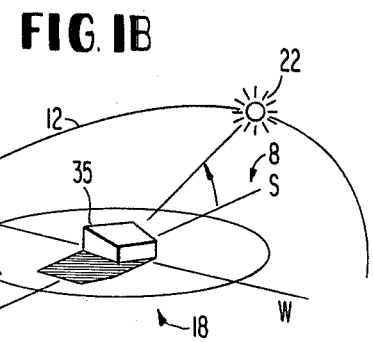
FIG.1B
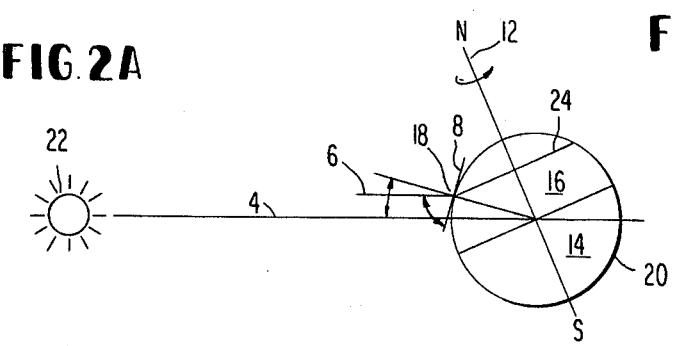
FIG.2A
FIG.2B
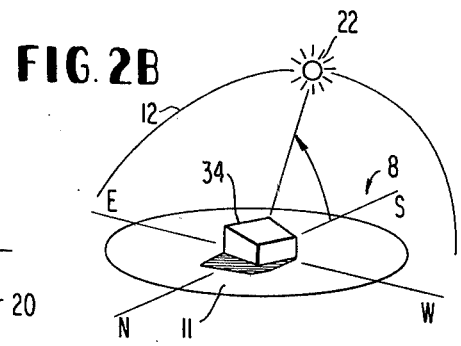
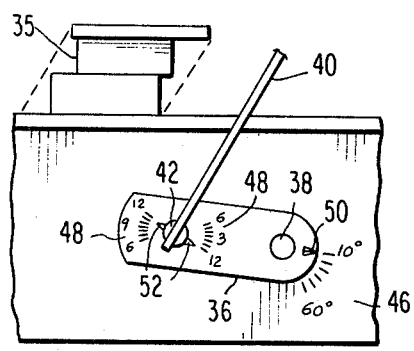
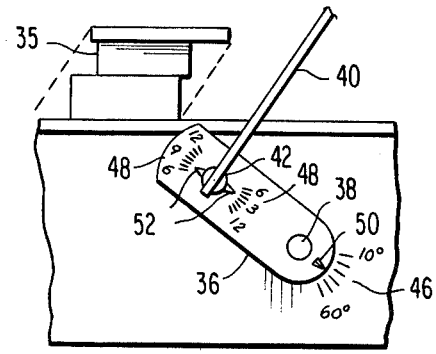
FIG.3B
FIG.3B
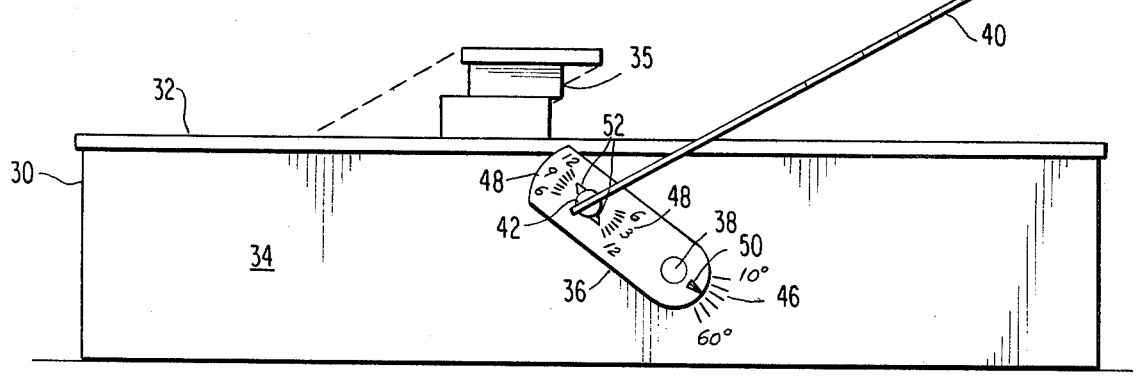
FIG.3

HEATING MODEL

BACKGROUND OF THE INVENTION

The present invention relates to a passive solar heating model that can be used for studying the daylight illumination of a scale model lot.

The design, construction and location of a manufacturing plant, office building, or residential building relative to a particular lot can significantly benefit from a study of the direction of the light from the sun throughout the year. Over the year the elevation of the sun changes, being lowest on December 21 and highest on June 21. The elevation of the sun is also dependent on the particular latitude where the lot is located. In addition, the elevation of the sun in the sky changes throughout the day as the sun rises and sets. The change in elevation of the sun in the sky changes the shadowing effects of trees, buildings, awnings, eaves, etc., which, in turn, materially affect heating and cooling costs during the year.

Various devices are available for studying the daylight illumination of a lot. Generally, these devices are suited for use only in laboratories, are complex, and are expensive. They are also used primarily for maximizing passive heating and generally are not well suited for maximizing cooling which is desirable during the summer. They do not utilize various size trees and eaves for studying a variety of shadowing effects. Finally, many of the devices cannot easily and accurately be adjusted for the particular parallel on which the lot is located and for the time or times of the year desired to be studied.

SUMMARY OF THE INVENTION

It is therefore a primary object of the present invention to overcome these and other disadvantages of the prior art by providing a passive solar heating model that is light in weight, simple to operate and economical to build.

It is another object to provide a passive solar heating model that can be used for studying passive cooling as well as passive heating.

It is still a further object to provide a model which can easily and accurately be adjusted for any given latitude in the northern hemisphere and for any given month and day of the year as well as for any given time of the day.

These and other objects are achieved by providing a passive solar heating model having a flat platform for supporting replicas of every day objects normally found on building lots, such as buildings with windows and eaves, trees of varying sizes, driveways, swimming pools, etc. A pair of arms are pivotally mounted at one end thereof to the opposite sides of the platform for latitude adjustments corresponding to the latitude where the lot is located. An arcuate guide track supporting a movable light source is pivotally connected at opposite ends thereof to the other ends of said arms. The guide track moves about its pivot for making month and day-of-the-month adjustments. Finally, the light source is movable along the guide track for making time-of-the-day adjustments.

By making the desired adjustments, the efficacy of sun shades, eaves, trees, bushes and similar projections can be determined for blocking sunlight from windows and walls for all times of the year at any latitude. In this manner, the optimum placement of these and other objects can be determined.

BRIEF DESCRIPTION OF THE DRAWINGS

FIG. 1A is a schematic illustration of the relative positions of the earth and sun on December 21, corresponding to the winter solstice;

FIG. 1B is a schematic illustration of the relative position of the sun in the sky at high noon on December 21;

FIG. 2A is a schematic illustration of the relative positions of the earth and sun on June 21, corresponding to the summer solstice;

FIG. 2B is a schematic illustration of the relative position of the sun in the sky at high noon on June 21;

FIG. 3 is a side view of the passive solar heating model made in accordance with the present invention;

FIG. 3A is a side view of the passive solar heating platform showing one side arm and a portion of the guide track in a particular position;

FIG. 3B is another side view of the passive solar heating platform showing the side arm in a position different from that shown in FIG. 3A;

DESCRIPTION OF THE PREFERRED EMBODIMENTS

Figure 4:
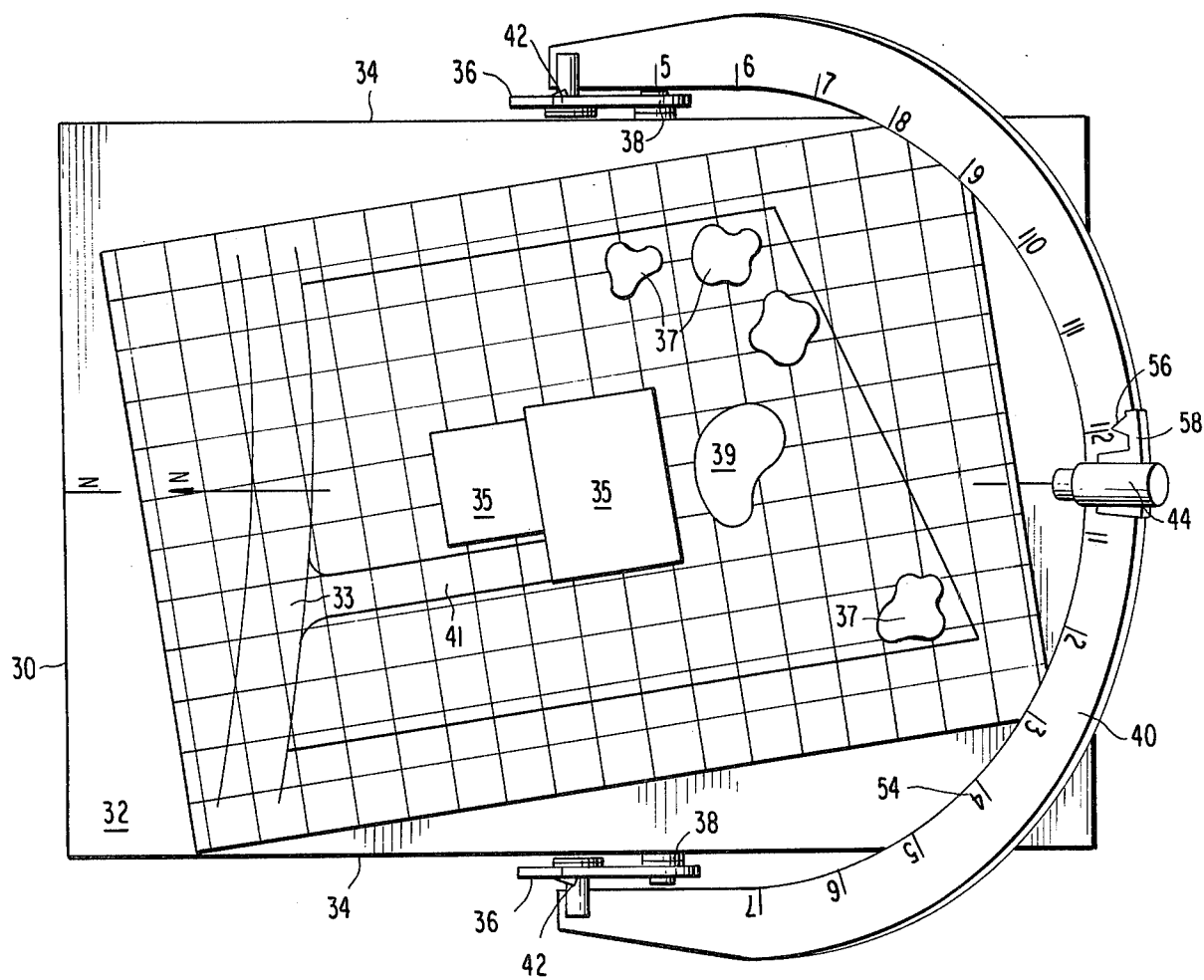
FIG. 4 is a top plan view of the passive solar heating model.

Referring to FIGS. 1A and 1B, the relative positions of the earth 20 and sun 22 are shown as they exist on December 21 corresponding to the winter solstice. The earth 20 revolves about its axis 12 in the direction of arrow 2 and is oriented such that the southern hemisphere 14 is closer to the sun 22 than the northern hemisphere 16. Point 18 on the 38th parallel, generally indicated by line 24, corresponds to the location of lot 11 shown in FIG. 1B. The line 8 tangent to the earth at point 18 represents the horizontal plane of the lot 11. Lines 4 and 6 are parallel to each other and represent the path along which light from the sun travels on its way to the earth.

Obviously, the dimensions in FIGS. 1A and 2A are not shown to scale and have been chosen for ease of illustration only. In actuality, the sun is very much larger than the earth and very far removed from the earth so that the light rays impinging upon the entire surface of the earth are very nearly parallel to one another. With this in mind, it is apparent that line 6 indicates the line of travel of sunlight. Line 6 and tangent line 8 form an angle of 28½ degrees in FIG. 1A corresponding to the degree of elevation of the sun 22 over lot 11 on December 21 at high noon.

Similarly, the angle formed by lines 6 and 8 in FIG. 2A indicates a sun elevation of 75½ degrees on June 21, the summer solstice.

FIGS. 1B and 2B show a portion of the earth's surface containing lot 11, and also show the position of the sun 22 in the sky at high noon at these two times of the year. As FIGS. 1B and 2B illustrate, the sun rises and falls from east to west along line 12 at elevations of 28½ degrees and 75½ degrees from the horizontal plane at the winter and summer solstices respectively. The elevation of the sun in the sky at all other times during the year varies between these two extremes.

FIG. 3 shows a side view and FIG. 4 a top view of the passive solar heating model made in accordance with the present invention. The model comprises a platfrom 30 with upper surface 32 for supporting a plurality of small scale replicas of real-life objects such as a building 35, trees 37, a street 33, a swimming pool 39, and a driveway 41. A pair of arms 36 are pivotally mounted at one end thereof at pivots 38 to the opposite sides 34 of platform 30. Rotation of arms 36 about pivots 38 allows for latitude adjustments. An arcuate guide track 40 is pivotally mounted to the other ends of arms 36 at pivots 42. Rotation of the guide track 40 about pivots 42 allows for time-of-the-year adjustments. A light source 44 is fixedly mounted on member 58 which, in turn, is movably mounted on the guide track 40 allowing for time-of-the-day adjustments. Light source 44 can contain lenses arranged so that parallel light rays are emitted from the light source 44. Such lense arrangements are well known to those skilled in the art and will not be described herein.

A scale 46, inscribed on the sides 34 of platform 30 adjacent to the pivoted ends of arms 36, cooperates with a pointer 50 for indicating the latitude adjustment of the arms 36. A second scale 48, inscribed at the free end of arm 36, cooperates with pointers 52 for indicating the time-of-the-year adjustment of the guide track 40 corresponding to the day-of-the-year for which sunlight effects wish to be studied. Finally, a third scale 54, located on the guide track 40, cooperates with a pointer 56 on member 58 for making time-of-the-day adjustments.

The model, which can be sold as a kit and readily assembled, is simple to use. To study the daylight illumination of a lot, it is first necessary to arrange the replicas on the upper surface 32 of the platform 30 in the manner desired to be studied. Next, arms 36 are rotated so that pointer 50 indicates the correct latitude corresponding to the parallel 24 on which the lot is located. The model can now be used to study the daylight illumination of the lot 11. Guide track 40 can be rotated about pivots 42 to select the month and day of the year of interest to be studied. Member 58 can be moved along guide track 40 to select the appropriate time of the day indicated by pointer 56. In this manner, the parallel light rays emitted from the light source 44 enable one to study the daylight illumination of the lot at all times of the year.

While the model shown in the drawings is suitable only for the northern hemisphere, a similar model having a slightly modified scale could be used in the southern hemisphere. While reference is made to parallel light rays it is understood that the rays are only substantially parallel.

I claim:

1. An apparatus for studying daylight illumination of a lot supporting objects comprising:
    (a) a stationary platform for supporting scaled-down models of said objects;
    (b) a pair of arms, each pivotally mounted at one end thereof to opposite sides of said platform for making latitude adjustments;
    (c) an arcuate guide track having two ends, each end pivotally mounted to the other end of each one of said arms for making time-of-the-year adjustments; and
    (d) a light source means for movably mounting said light source on said guide track, said light source being movable along said guide track for making time-of-the-day adjustments;
    (e) a time-of-the-year scale carried by the other end of each arm adjacent the mounting location of the track ends and a latitude scale carried by the platform adjacent the pivotally mounted end of each arm.

2. An apparatus as claimed in claim 1, wherein said light source is provided with means to emit parallel light rays.

3. An apparatus as claimed in claim 1, further comprising time-of-the-day indicator means located on said guide track for indicating said time-of-the-day adjustments.

4. An apparatus as claimed in claim 3, wherein the size of said replicas are proportional to the actual size of said objects.

5. An apparatus as claimed in claim 4, wherein said replicas comprise a building having windows, and a plurality of trees having different heights.

* * * * *